United States Patent
Baribault et al.

(10) Patent No.: US 10,122,581 B2
(45) Date of Patent: *Nov. 6, 2018

(54) DEVICE MIGRATION

(71) Applicant: Microsoft Technology Licensing, LLC, Redmond, WA (US)

(72) Inventors: Gregory Baribault, Lynnwood, WA (US); Larry A. Morris, Kirkland, WA (US); John Mark Miller, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,899

(22) Filed: Aug. 16, 2017

(65) Prior Publication Data
US 2018/0034697 A1 Feb. 1, 2018

Related U.S. Application Data

(63) Continuation of application No. 15/040,988, filed on Feb. 10, 2016, now Pat. No. 9,774,500, which is a continuation of application No. 14/263,317, filed on Apr. 28, 2014, now Pat. No. 9,426,031, which is a continuation of application No. 11/864,636, filed on Sep. 28, 2007, now Pat. No. 8,744,423.

(51) Int. Cl.
H04L 12/24 (2006.01)
H04M 3/42 (2006.01)
H04W 8/24 (2009.01)
H04W 4/80 (2018.01)

(52) U.S. Cl.
CPC .......... *H04L 41/0846* (2013.01); *H04M 3/42* (2013.01); *H04W 4/80* (2018.02); *H04W 8/24* (2013.01); *H04M 2203/554* (2013.01); *H04M 2207/18* (2013.01)

(58) Field of Classification Search
CPC ...... G06F 21/31; H04M 1/7253; H04W 12/08
USPC .............. 379/211.02, 201.03, 265.11, 93.23; 455/456.2, 412.2, 575.1, 566, 456.1, 449, 455/411

See application file for complete search history.

(56) References Cited

U.S. PATENT DOCUMENTS

| 6,674,403 | B2 | 1/2004 | Gray et al. |
| 7,162,229 | B2 | 1/2007 | Kazakevich |
| 7,822,384 | B2 | 10/2010 | Anschutz et al. |
| 7,900,229 | B2 | 3/2011 | Dureau |
| 9,104,850 | B1 * | 8/2015 | Braden ............ G06F 21/31 |

(Continued)

OTHER PUBLICATIONS

"Final Office Action Issued in U.S. Appl. No. 11/864,636", dated Feb. 16, 2011, 12 Pages.
"Non-Final Office Action Issued in U.S. Appl. No. 11/864,636", dated Sep. 5, 2013, 11 Pages.
"Non-Final Office Action Issued in U.S. Appl. No. 11/864,636", dated Sep. 8, 2010, 9 Pages.
"Notice of Allowance Issued in U.S. Appl. No. 11/864,636", dated Jan. 24, 2014, 10 Pages.

(Continued)

*Primary Examiner* — Kiet M Doan
(74) *Attorney, Agent, or Firm* — Mark K. Young; Mayer & Williams PC

(57) ABSTRACT

Personalization data such as settings and/or state is migrated across devices including mobile phones. Device personalizations are pushed to a cloud service or other mechanism for backup and subsequent transmission to other devices. The personalization data can later be employed to configure one or more other devices in the same manner as a first device.

20 Claims, 13 Drawing Sheets

(56) References Cited

U.S. PATENT DOCUMENTS

| | | | |
|---|---|---|---|
| 9,131,370 B2* | 9/2015 | Schrecker | H04B 5/0006 |
| 9,704,202 B1* | 7/2017 | Delker | G06Q 50/01 |
| 2003/0211840 A1 | 11/2003 | Castrogiovanni et al. | |
| 2004/0077349 A1 | 4/2004 | Barak et al. | |
| 2005/0102300 A1 | 5/2005 | Madsen | |
| 2005/0159142 A1 | 7/2005 | Giniger et al. | |
| 2006/0040670 A1* | 2/2006 | Li | H04L 45/42 |
| | | | 455/445 |
| 2006/0154649 A1 | 7/2006 | Pedersen et al. | |
| 2007/0004391 A1 | 1/2007 | Maffeis | |
| 2007/0190939 A1 | 8/2007 | Abel | |
| 2008/0014933 A1 | 1/2008 | Montz et al. | |
| 2008/0057902 A1* | 3/2008 | Sidon | H04M 19/04 |
| | | | 455/401 |
| 2008/0065718 A1 | 3/2008 | Todd et al. | |
| 2008/0215450 A1 | 9/2008 | Gates et al. | |
| 2008/0228963 A1 | 9/2008 | Hironaka et al. | |
| 2009/0055467 A1 | 2/2009 | Petersen | |

OTHER PUBLICATIONS

"Final Office Action Issued in U.S. Appl. No. 14/263,317", dated Jun. 3, 2015, 10 Pages.

"Non-Final Office Action Issued in U.S. Appl. No. 14/263,317", dated Dec. 15, 2014, 12 Pages.

"Non-Final Office Action Issued in U.S. Appl. No. 14/263,317", dated Dec. 24, 2015, 12 Pages.

"Notice of Allowance Issued in U.S. Appl. No. 14/263,317", dated Apr. 28, 2016, 8 Pages.

"Final Office Action Issued in U.S. Appl. No. 15/040,988", dated May 12, 2017, 11 Pages.

"Non Final Office Action Issued in U.S. Appl. No. 15/040,988", dated Dec. 29, 2016, 10 Pages.

"Notice of Allowance Issued in U.S. Appl. No. 15/040,988", dated Aug. 14, 2017, 8 Pages.

Murgolo, et al., "Desktop Deployment Get a Move on: Migrate User Data With USMT", In Proceedings of TechNet Magazine, Mar. 2006, 10 Pages.

* cited by examiner

DEVICE MIGRATION

CROSS REFERENCE TO RELATED APPLICATIONS

This application is a continuation of U.S. patent application Ser. No. 15/040,988, filed Feb. 10, 2016, entitled, "DEVICE MIGRATION", which is a continuation of U.S. patent application Ser. No. 14/263,317 filed Apr. 28, 2014, entitled "DEVICE MIGRATION", now U.S. Pat. No. 9,426,031, which is a continuation of U.S. patent application Ser. No. 11/864,636 filed Sep. 28, 2007, entitled "DEVICE MIGRATION", now U.S. Pat. No. 8,744,423, the contents of which are hereby incorporated by reference in their entirety.

BACKGROUND

Computers and other processor-based devices are pervasive in today's society. Although originally the sole domain of well-funded companies and research institutions, technology advancements and cost reductions over time have enabled computers and other electronic devices to become commonplace in the lives of most everyone. Continued technological advancements over time have led to a dramatic decrease in both size and cost of electronic components. As a result, the popularity of bulky desktop-style computers is giving way to smaller mobile devices such as mobile phones, personal digital assistance, and/or media players.

The most popular of the mobile devices are communication devices in general and more particularly mobile or cellular telephones. Not too long ago mobile communication devices were luxury items affordable only to those with substantial means. Moreover, these devices were of significant size rendering them inconvenient for extended portable employment. In contrast, most current mobile communication devices can be carried easily in a user's pocket or handbag. Furthermore, conventional devices include added functionality such as game applications, web access, address books, image capture/display video capture/display, and text messaging.

Additionally, mobile communication device development and refinement continues to occur at an expeditious pace. Advancements in mobile communication devices are largely a function of consumer demand. In order to fulfill consumer needs, the industry provides a plurality of devices (e.g., models of devices having various applications, and features). Smaller devices, game applications, web access, storage capacity, display size, ergonomics, phonebook storage, longer battery life, are a few examples that encourage the mobile communication device industry to improve upon existing technology.

Mobile devices are increasing in technological ability affording a plurality of functionality within a limited device-space. Mobile devices can include cell phones, personal digital assistance, pagers, messenger devices, handhelds or palmtops, and smart phones, among others. Although each device provides a specific function, devices have been developing to allow overlapping functionality in order to appeal to consumer needs. For example, cell phones can provide cellular service, phonebooks, calendars, games, voicemail, paging, web browsing, video capture, image capture, voice memos, and voice recognition.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to device migration. More specifically, device personalizations such as installed applications, content, settings, state, and the like can be stored utilizing a cloud service or other transport mechanisms to facilitate dynamic access and/or transfer of such information to other devices. Among other things, this provides a type of backup to ensure that personalizations are not lost and relieves users from the time-consuming and frustrating process associated with reinstallation and/or customization. Additionally or alternatively, device migration can facilitate utilization of multiple devices with substantially the same level of details and settings.

In accordance with one aspect of the disclosure, personalizations can be partitioned as a function of multiple identities and/or personas. For example, a device can be dynamically configured for one or more business and/or personal modes automatically, semi-automatically or in response to an explicit instruction.

According to another aspect, personalization data can be, standardized, normalized, and/or translated to facilitate migration across heterogeneous devices. In other words, mechanisms are provided for abstracting, normalizing, or translating personalization data to ensure it is usable, renderable, or otherwise appropriate for different devices and/or device classes.

In accordance with another aspect of the disclosure, personalization data can be streamed to a device as a function of device capability and/or network connectivity. Various caching mechanisms such as eager and deferred loading are provide to facilitate operation. For instance, all or a portion of personalization data can be pre-fetched and cached or persisted on device. Otherwise, such data can be lazy loaded on an as needed basis or a hybrid of the two.

In accordance with yet another aspect, personalization data can be migrated to secondary devices. Further, communications and personalizations can be split across multiple devices to provide a richer environment. The split can be a function of location among other things and can dynamically update in response to changing position.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION OF ILLUSTRATIVE EMBODIMENTS

Systems and methods described hereinafter relate to data migration between devices in general. More specifically, personalization data or information is migrated from one device to another. In one embodiment, such information can be backed-up utilizing a remote service and subsequently employed to configure other devices to be substantially identical to another device for example with respect to contacts, settings, preferences, among other things. According to one aspect, dynamic caching and/or synchronization can occur as a function of device capability and/or availability. Further, where unavailable, data can be redirected to another device. Still further yet, such information can be distributed across multiple devices.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
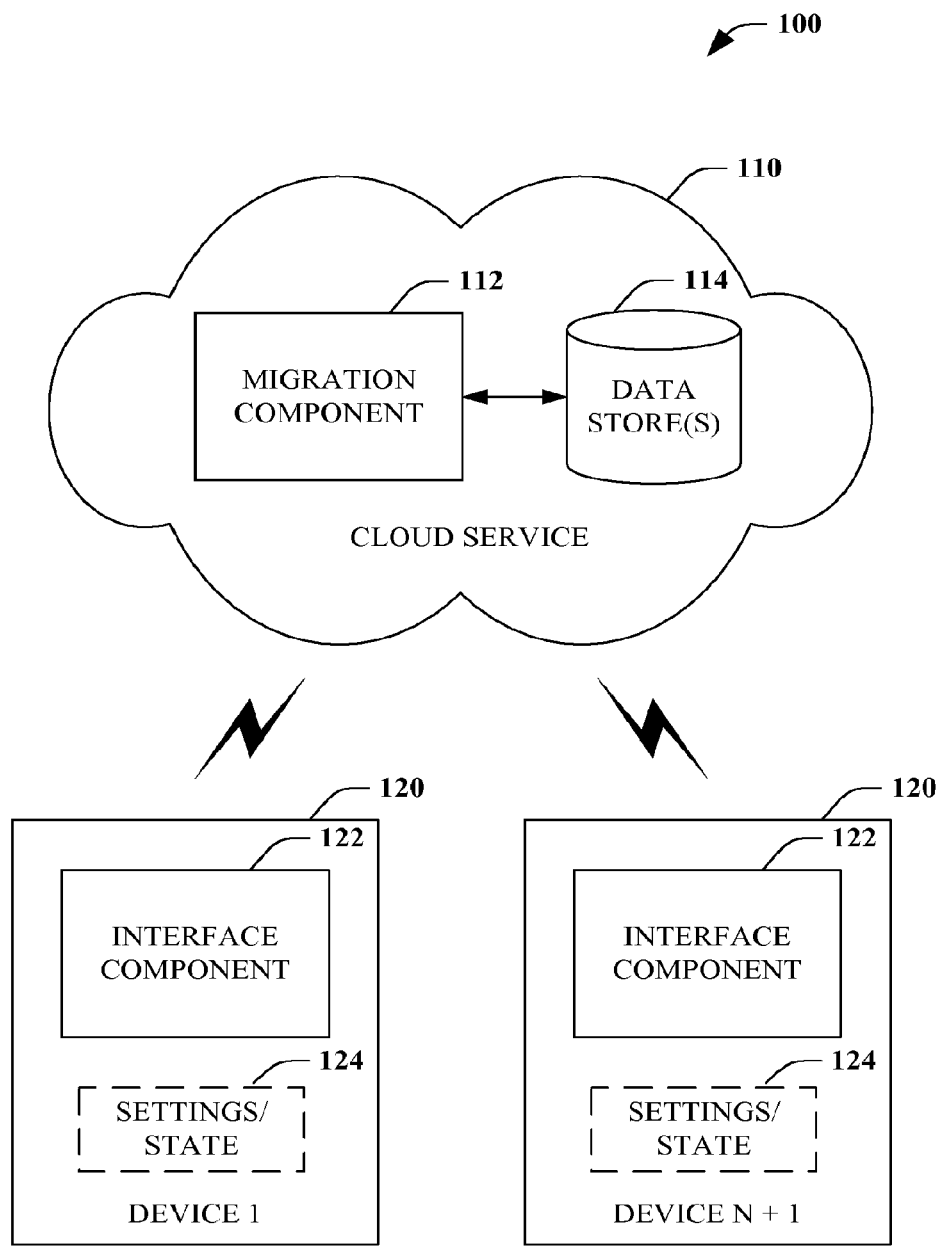
FIG. 1 is a block diagram of data migration system in accordance with an aspect of the disclosed subject matter.

Referring initially to FIG. 1, a data migration system is illustrated in accordance with the claimed subject matter. The system includes a cloud service 110 that provides remote network accessible functionality. This specific cloud service 110 includes a migration component 112 as well as one or more data stores 114. Accordingly, it can alternatively be referred to as a migration cloud service. The cloud service 110 is accessible by a plurality of mobile devices 120. As shown, the cloud service 110 is accessed by device "1" and device "N+1," where "N" is an integer greater than or equal to one. In one embodiment, the devices 120 can correspond to mobile communication devices including mobile or cellular telephones, or the like; however, the claimed subject matter is not limited thereto.

The devices 120 are communicatively coupled to the cloud service 110 to enable interaction or receipt and transmission of data. More particularly, personalizations or personalization data is exchanged including, among other things, installed applications, content (e.g., music, video, pictures . . . ), settings, state, and the like. The type, kind, and extent of data can be a function of device-supported functionality. For example, where the devices 120 correspond to mobile phones the data can include contacts, ring tones, settings, preferences, and/or rules.

Each device 120 can include an interface component 122 to facilitate interaction. The interface component 122 can communicate directly or indirectly with the migration component 112 of the cloud service 110. In one instance, the interface component 122 can upload personalization data such as settings and/or state information 124 to the cloud service 110, which can store the uploaded data to the one or more data stores 114. This can be done upon explicit command or automatically as a function of change, for instance, to keep the data up to date or synchronize the data. Alternatively, the interface component 120 can facilitate receipt and/or retrieval of previously uploaded personalization data including setting and/or state information from the cloud service 110.

The migration component 112 can manage acquisition and provisioning of data to and/or from multiple devices 120. This component or an associated interface (not shown) can be available to receive data from a device 120 and persist the data to at least one data store 114. Additionally, the migration component 112 can respond to a request for data from a device 120 by retrieving the appropriate data from at least one data store 114 and providing or otherwise making the data available to the device 120.

By way of example and not limitation, mobile phone data can be migrated between multiple phones. Personalization data can be uploaded from a first or primary mobile phone to the cloud service 110. Later this data can be downloaded to a second phone for use where desired. Additionally and as will be described further infra, acquired data can be utilized to configure the phone. In this manner, phones can be configured to be substantially identical to others. This can be beneficial in many situations. For instance, upon purchase of a new phone all customizations on an old phone including pictures, ring tones and applications can be effected on the new phone. Additionally, a purchased or rented phone utilized in connection with world travel can be setup automatically to appear substantially the same as a primary phone. Further, individuals may have multiple phones (e.g., work, home, personal . . . ) in which case changes on one can be propagated to others affording the same level of detail and settings.

While migration functionality can be effectuated utilizing a cloud as provided herein, it is to be noted that the claimed subject matter is not limited thereto. Aspects of data migration described above as well as below can be transport agnostic. In other words, migration of state, settings, and/or the like can be embodied with respect to other transport mechanisms besides a network-based service. By way of example and not limitation, a user can plug a flash memory stick into a device such as a phone extract the settings and move them to a new phone.

Figure 2:
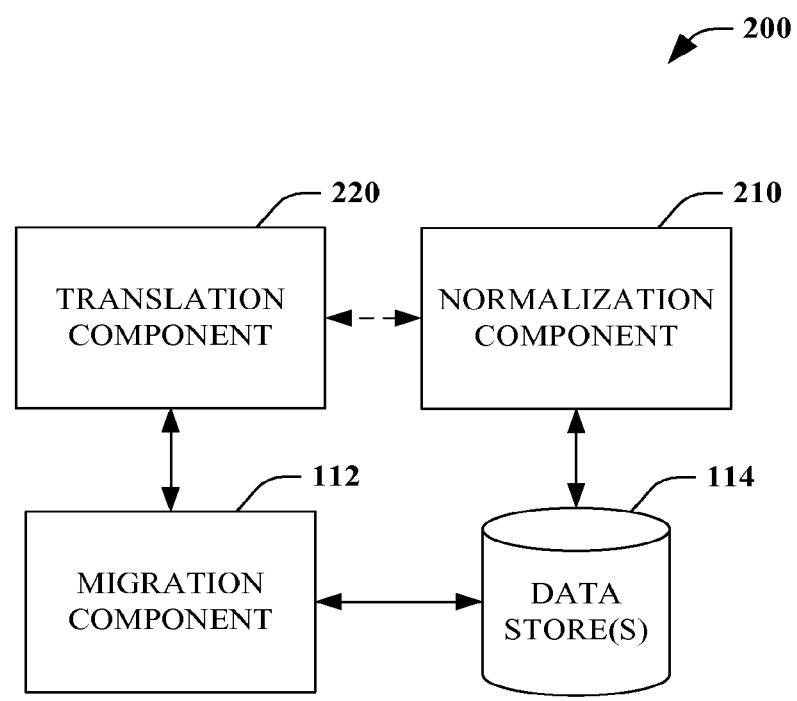
FIG. 2 is a block diagram of a data migration system that facilitates normalization and/or translation of data in accordance with an aspect of the disclosed subject matter.

FIG. 2 depicts data migration system 200 in accordance with an aspect of the claimed subject matter. Similar to FIG. 1, the system 200 can be a cloud service and include the migration component 112 and one or more data stores 114, as previously described. However, data migration need not be limited to the same or substantially the same devices. Accordingly, the system 200 can include one or more of normalization component 210 and translation component 220. The normalization component 210 can normalize or standardize persisted data or data to be persisted to one or more data stores 114. Data from various device manufacturers can be in different or proprietary in nature. The normalization component 210 can map this data to a standard format for storage and subsequent use.

The translation component 220 can translate data from a first format to a second format. In one instance, the translation component 220 can convert a standardized format to a proprietary format. However, the translation component 220 can also convert between source and target proprietary formats. Furthermore, translation can be between settings of dissimilar types on different devices or device classes. For example, one device can be a touch screen phone with settings and/or states associated with the fact that it is touch screen. These settings and/or states need not be pushed down to a non-touch screen phone since they are irrelevant. In other words, settings content can be abstracted to ensure it is usable, renderable, or appropriate on different classes of devices.

Figure 3:
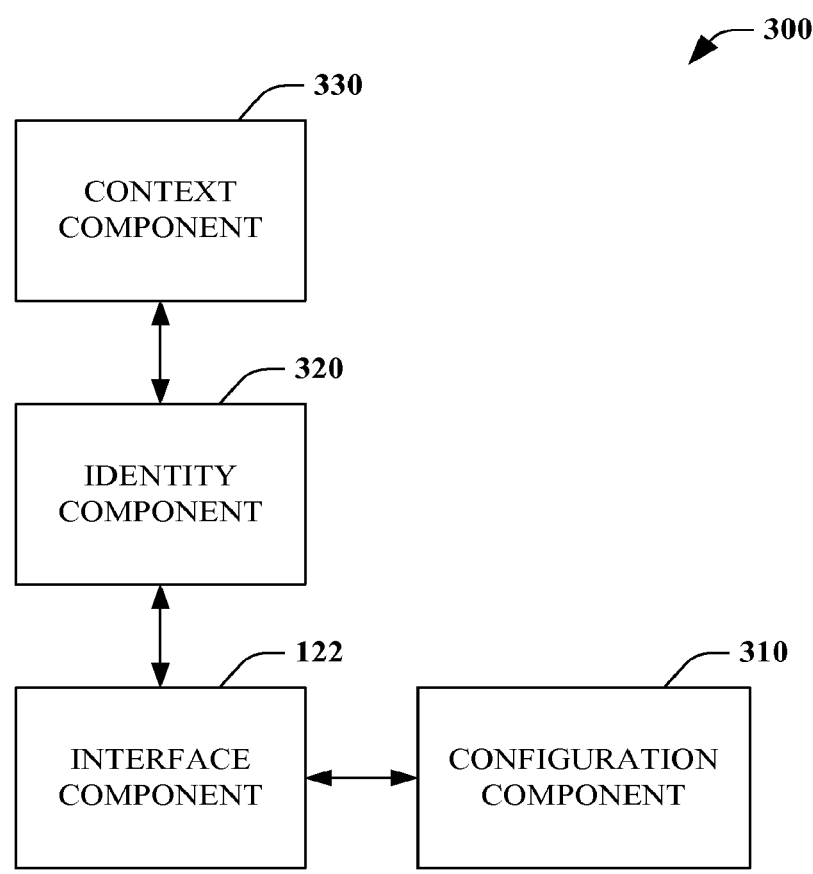
FIG. 3 is a block diagram of a device migration system in accordance with an aspect of the disclosed subject matter.

Turning attention to FIG. 3, a device migration system 300 is illustrated in accordance with an aspect of the claimed subject matter. Similar to system 100 of FIG. 1, system 300 includes the interface component 122 to facilitate interaction with a migration cloud service. More specifically, the interface component 122 can provision data to or acquire data from a cloud migration service. In one instance, data can simply be downloaded and saved on a device (e.g., music, picture . . . ). Additionally or alternatively, the device can utilized such data to further customize the device. In accordance with one aspect, settings and/or state information can be acquired by the device. Configuration component 310 can employ such information to configure a device to function substantially similar to another device. For example, contacts can be populated, ring tones fixed, wallpaper set, and applications loaded, among other things.

The system 300 also includes an identity component 320 to enable further customization. Individuals are often associated with multiple identities or personas. For instance, users often have different business and personal identities. The identity component 320 enables a user to set an identity and cause a device to be configured in accordance with that identity. In effect, this can correspond to requesting and/or acquiring identity or mode specific information via interface component 122 from a data migration service, which can partition data in this way. By way of example, user mobile device such as a mobile phone can be configured for a business mode or a personal mode. Here, a different set of contacts, rules, policies, ring tones, songs, favorites, settings, among other things can be loaded as a function of the mode. Hence, the device can dynamically configure settings, contacts and the like in the evenings or weekends for use in a non-business more personal manner and vice versa for working hours.

Devices can be programmed to change modes in response to an explicit command and/or semi-automatically. For instance, a user can explicitly select a particular mode or identity for which a device is to be configured. Alternatively, a user can set up rules or preferences to drive a more automatic transition between modes. For example, a mobile phone can be designated for business use during the hours of 9 a.m. and 5 p.m. Monday through Friday and otherwise it is configured for personal use.

Furthermore, modes can be altered automatically as a function of context information received or retrieved by the context component 330. In this case, context information such as geographical location can be utilized to infer a mode or identity and automatically and dynamically configure a mobile device. Additional contextual information can include proximity to other individuals, among other things. For example, a device component can communicate with other devices within a predefined area via a near field communication (NFC) technology to identify their owners and/or modes. This information alone or in combination with other context information such as geographical location, time and date can be utilized to infer a user identity and/or device mode and initiate configuration in accordance with the identity and/or mode. Various machine-learning mechanisms can also be utilized to ultimately improve the accuracy of inference over time.

Figure 4:
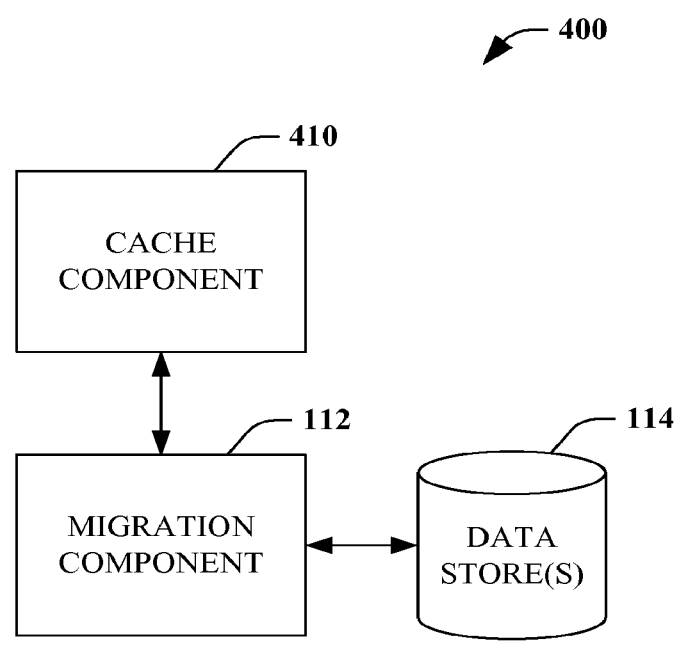
FIG. 4 is a block diagram of a data migration system that facilitates caching of data in accordance with an aspect of the disclosed subject matter.

Referring to FIG. 4, a cloud data migration system 400 is depicted in accordance with an aspect of the claimed subject matter. As similarly shown and described with respect to FIGS. 1 and 2, the system 400 includes the migration component 112 and one or more data stores 114 to enable migration of personalization data between and/or amongst devices. Further provided is cache component 410 communicatively coupled to the migration component 112. While the migration component 112 can simply provide all personalization data or the like in one transaction, the process can be more continuous and interactive via employment of the cache component 410. The cache component 410 can control or throttle data afforded to devices as a function of one or more variables such as device capability and/or network connectivity, among other things.

Devices often include differing processing capabilities. Accordingly, a device may not be able to be configured and/or locally store all data associated with another device. For example, one device can be a powerful smart phone and the other a thin client phone. Alternatively, for security and other reasons it might not be desirable to house all personalization information on a device. The cache component 410 resolves this dilemma by providing the phone with as much data as it can handle in an efficient and/or secure manner and on an as needed basis.

More specifically, the cache component 410 can enable eager and/or deferred loading of data at various levels of granularity. For instance, the cache component 410 can enable eager loading or pre-fetching of data where it can be determined that it will likely be needed in the future. Additionally or alternatively, the cache component 410 can enable deferred or lazy loading of data, wherein the data is only loaded when requested. By way of example, where a contacts list is substantially large and/or available storage space is relatively small the cache component 410 can ensure that the most popular or most recently used contacts are pre-fetched and loaded on the device, and other contact information can be loaded lazily upon request. Similarly, data can be cached as a function of network availability or predicted availability. For instance, if a device senses that it is approaching an area where connectivity may be lost, it can pre-fetch more content and persisted such information to the device.

Figure 5:
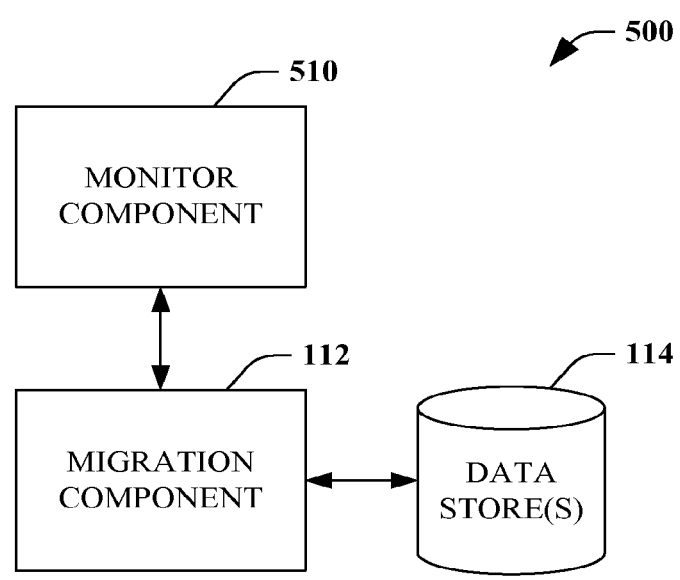
FIG. 5 is a block diagram of a system that alters data migration based on device availability in accordance with an aspect of the disclosed subject matter.

FIG. 5 depicts a cloud migration system 500 in accordance with an aspect of the claimed subject matter. As previously described, system 500 includes a migration component 112 and one or more data stores 114. Furthermore, the system 500 includes a monitor component 510. The monitor component 510 monitors the device availability and initiates or redirects migration to alternate devices in the event the first or primary device is unavailable. For example, the migration system 500 can lose contact with a mobile communication device where it is out of service range or its battery dies, among other things. Where the monitor component 510 determines that a device is unavailable, for instance after a predefined period of unresponsiveness, and a communication is directed to the device such as a call, data can be routed to another device in accordance with a rule, preference or other mechanism.

Consider the situation where a user's mobile phone battery dies and an incoming call is received. Not only can the call be transferred or redirected to another phone such as that of a detected friend nearby (e.g., using NFC), but all or a portion of personalization data can be also be transferred. In other words, the call and all or a portion of phone settings can be moved to another device. In this case, the friend can notify the user that they have a call that has been transferred to their phone and the user can answer the call on the friend's phone, wherein the phone is loaded with the same of similar personalization data. Accordingly, the user can also subsequently look up their contacts utilizing the friend's phone to notify others that his/her battery has died and to call a different number or leave a message.

Figure 6:
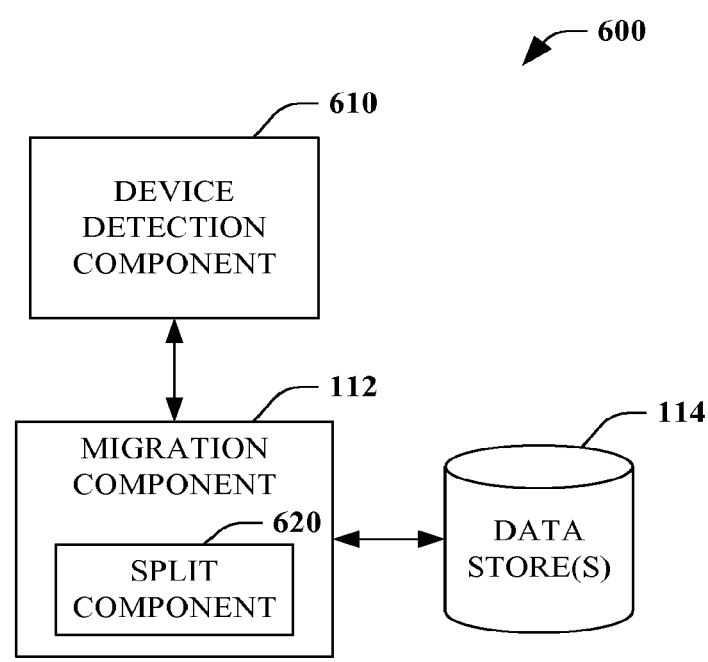
FIG. 6 is a block diagram of a migration system that distributes data across multiple devices in accordance with an aspect of the disclosed subject matter.

Referring to FIG. 6, a migration division system 600 is illustrated in accordance with an aspect of the claimed subject matter. The system 600 includes a migration component 112 and one or more data stores 114 as previously described. In brief, the migration component 112 accepts and distributes personalization data housed in data store(s) 114 such as installed applications, content (e.g., music, video, pictures . . . ), settings, and/or state, amongst others to devices. Up to this point, discussion has been focused on transferring personalization data to single devices. The claimed subject matter is not so limited.

System 600 also includes a device detection component 610 that can identify secondary devices and a split component 620 for dividing communications and personalized data across multiple devices concurrently. The device detection component 610 can identify secondary devices as a function of location and/or near field communication technologies, among other means. Upon identification of such a device, migration component 610 can migrate or move a portion of communication and personalization settings to the secondary device. For example, the video portion of a video phone call and associated personalization settings can be migrated to a proximate television to enable the call to be carried out in a richer environment. Furthermore, as a user moves video can continue to be migrated to the closest television. Alternatively, a mobile video call can be migrated to a house phone and plasma television and further migrate as the user changes locations. Migrated data, applications, and the like can adapt to the capabilities of the new device (e.g., screen real estate, processing capabilities, memory . . . ).

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the identity component 320 can employ such mechanisms to facilitate inferring an identity, persona, or mode.

In view of the exemplary systems described supra, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
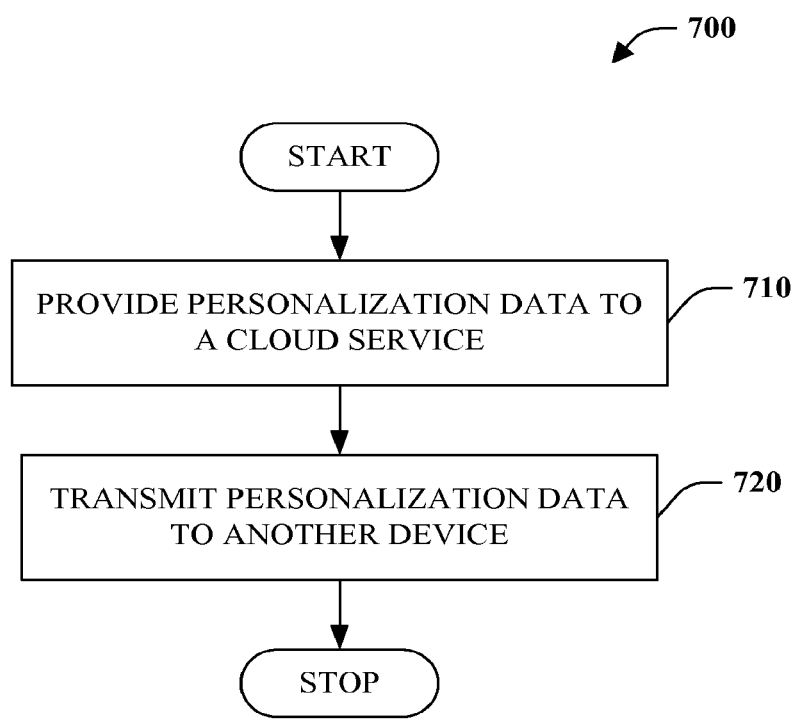
FIG. 7 is a flow chart diagram of a method of data migration according to an aspect of the claimed subject matter.

Referring to FIG. 7, a method 700 of data migration is illustrated in accordance with an aspect of the claimed subject matter. At reference numeral 710, personalization data is provided to a cloud service. The personalization data can include a set of data associated with personalizing or customizing a device for use by a particular user. This set of data can include installed applications, content (e.g., music, video, pictures . . . ), settings, and/or state, among other things. At reference 720, this personalization data is provisioned to another device. In this manner, a second device (e.g., new, rented, borrowed, additional) can be instantiated to appear and/or operate in the same or nearly the same way as a first device. By way of example and not limitation, consider a scenario where a user's mobile phone is regularly provisions personalization data to the cloud service and subsequently is disabled or lost. Utilizing the cloud service, a newly purchased phone can be configured out of the box to be nearly identical to the previous phone with respect to contacts (e.g., address book), content (e.g., music, video, pictures . . . ), settings (e.g., ring tones, wallpaper . . . ), and/or the like.

Figure 8:
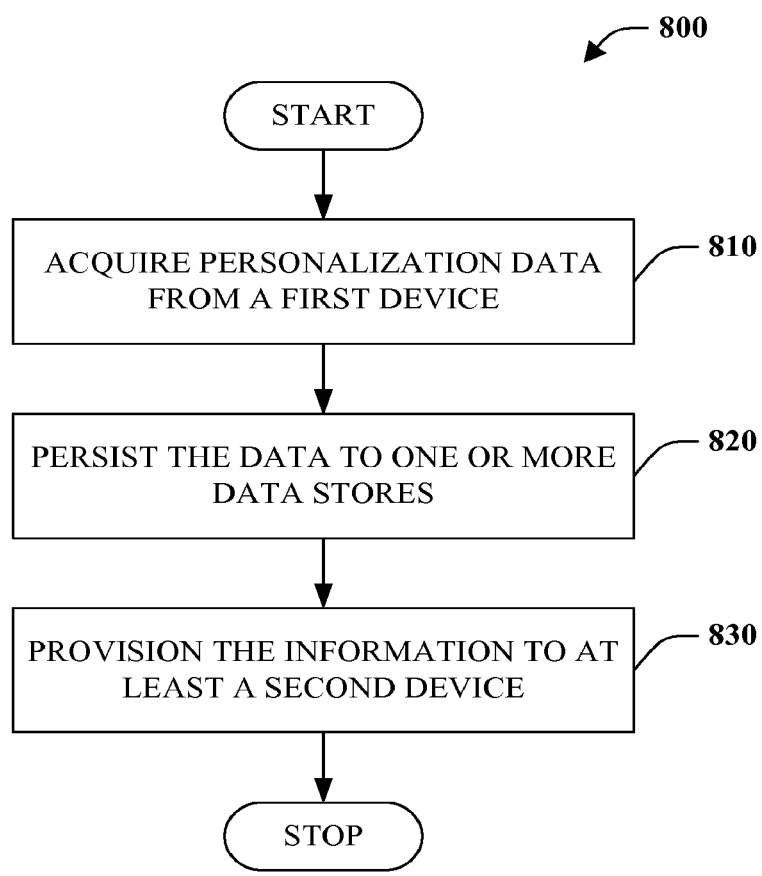
FIG. 8 is a flow chart diagram of a method of device configuration in accordance with an aspect of the claimed subject matter.

FIG. 8 is a flow chart diagram of a migration service method 800 in accordance with an aspect of the claimed subject matter. At reference numeral 810, personalization data is acquired from a device such as mobile phone, for example. The acquired data is persisted to at least one data store at numeral 820. In one instance, such data can be partitioned by identity or persona (e.g., work, personal . . . ) to facilitate retrieval and provisioning of such information. At reference 830, the acquired and/or persisted personalization data is provisioned to at least a second device. The act of provisioning can be automatic, semi-automatic, and/or responsive to a request for such data. Furthermore, the amount and type of data provisioned can be a function of identity, device capabilities, and/or network connectivity, among other things.

Figure 9:
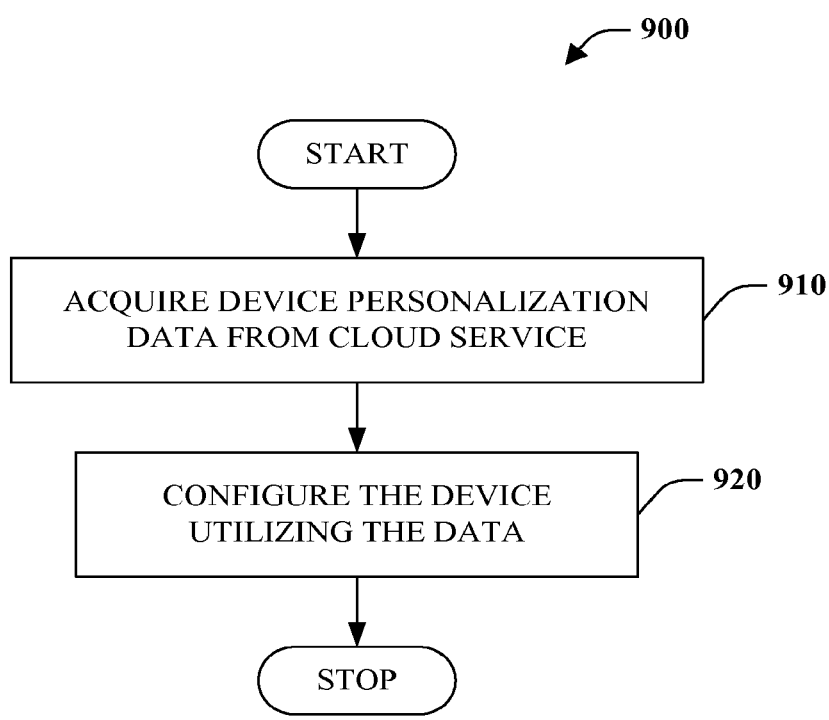
FIG. 9 is a flow chart diagram of device configuration according to an aspect of the disclosed subject matter.

FIG. 9 depicts a method of device configuration 900 according to an aspect of the claimed subject matter. At reference numeral 910, a device acquires personalization data from a cloud service such as installed applications, content (e.g., music, video, pictures . . . ), settings, and/or state. In one instance, the device can be cognitive in nature in that it will sense available resources (e.g., near WiFi, available licensed band, unlicensed band . . . ) and modify behavior as a function of user movement (moving toward an area with limited resources). Furthermore, the data acquired can be a function of identity, device capabilities, and/or network connectivity, among other things. At 920, this data is employed to configure a device. With respect to a mobile phone, applications (e.g., navigator, document viewer . . . ) and contacts can be loaded, ring tones and background set and state established, for example.

Figure 10:
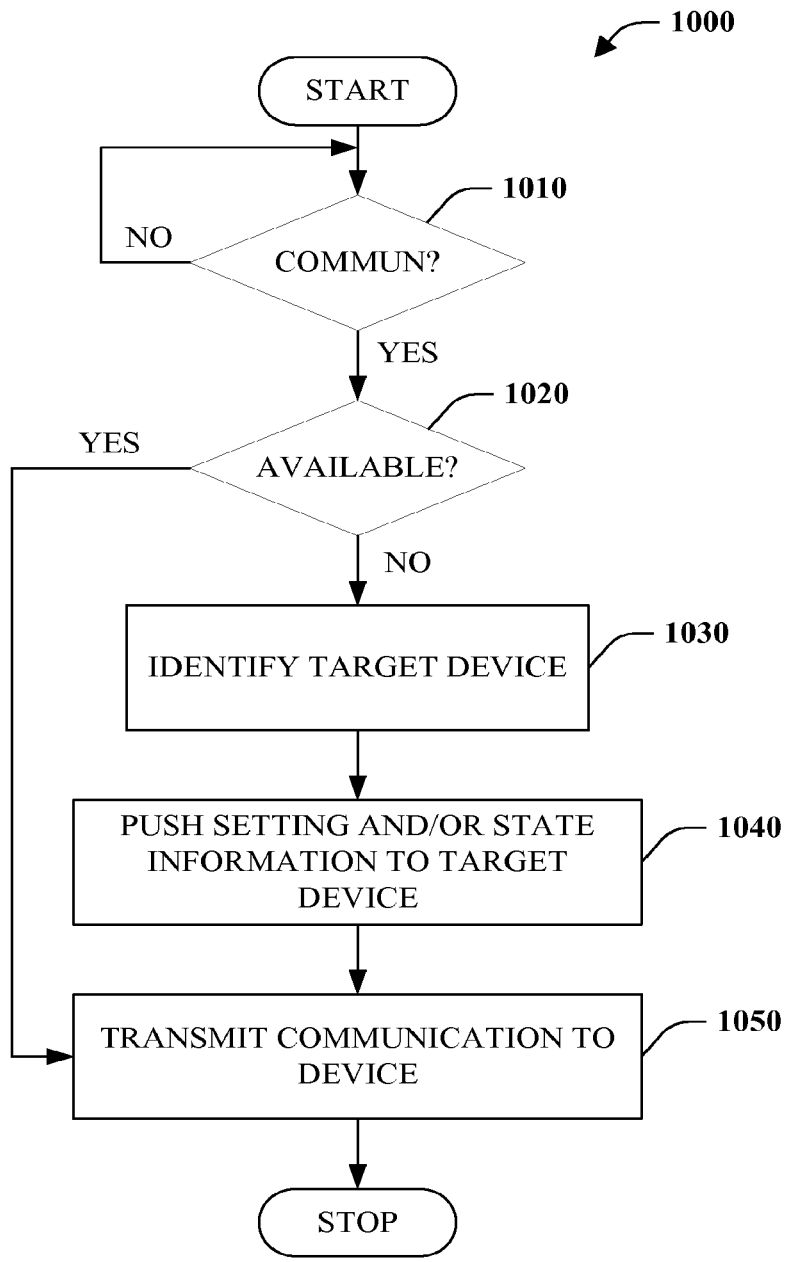
FIG. 10 is a flow chart diagram of a communication processing method utilizing device migration in accordance with an aspect of the disclosed subject matter.

FIG. 10 is a flow chart diagram of a method of communication processing utilizing device migration 1000 in accordance with an aspect of the claimed subject matter. At reference numeral 1010, a determination is made as to whether a communication has been received such as a telephone call. If not, the method 1000 continues to loop until a communication is indeed acquired. If a communication is received, then method 1000 continues at 1020 where another determination is made concerning the availability of a device to which the communication is directed. For example, a device can be unavailable due to a low battery or residing in a communication dead zone, among other things. If the device is available, the communication is transmitted to the device at reference 1050. Alternatively, if the device is unavailable the method 1000 continues at 1030 where a target device is identified. Among other things, this can be a result of an explicit designation, preference or rule and/or an automatic procedure, for instance via identification of nearby devices. At reference numeral 1040, settings, state information or the like are pushed to the target device to facilitate configuration thereof. The communication can then be transmitted to the configured target device at numeral 1050.

Figure 11:
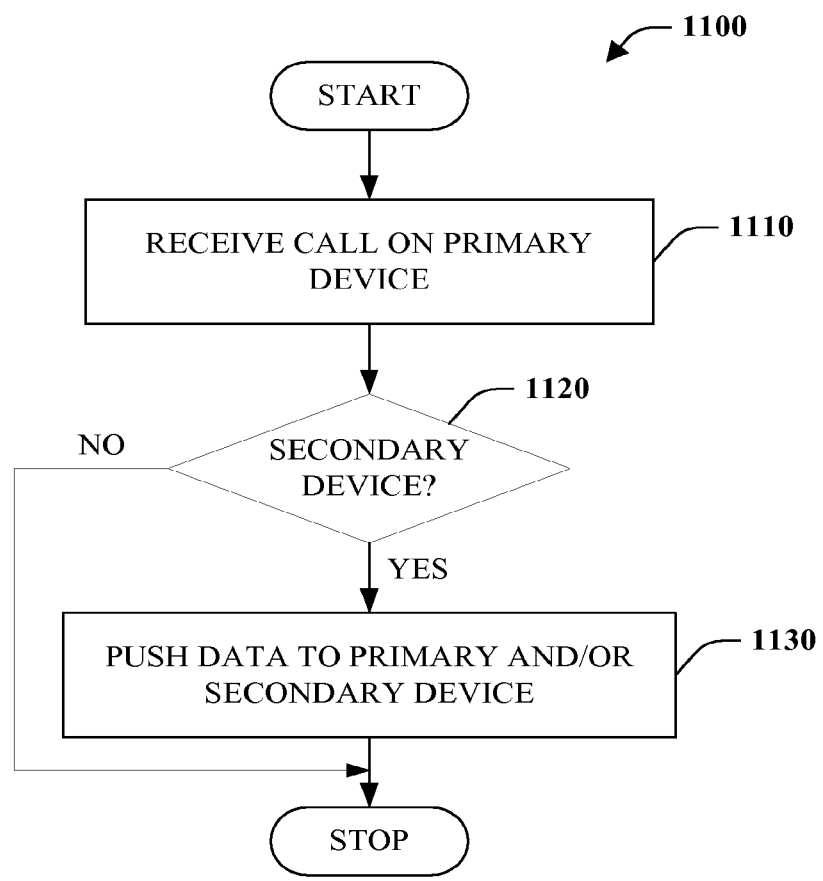
FIG. 11 is a flow chart diagram of a multiple device migration method in accordance with an aspect of the disclosed subject matter.

Turning to FIG. 11, a multiple device migration method 1100 is depicted in accordance with an aspect of the claimed subject matter. At reference 1110, a call or other communication is received on a primary device such as a mobile phone. At numeral 1120, a determination is made pertaining to whether a secondary device is available. If no the method 1100 simply terminates. If yes, call and all settings and/or personalization data is pushed or moved to the primary and/or secondary device. For example, portions of the communication such as speech and video can be split such that voice is transmitted across a primary mobile phone and video is presented on a proximate television or computer monitor. Further, as a user moves about the video and settings can be migrated to the closest available video monitor.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

A "cloud" or "cloud service" is intended to refer to a collection of resources (e.g., hardware and/or software) provided and maintained by an off-site party (e.g., third party), wherein the collection of resources can be accessed by an entity over a network (e.g., Internet, WAN . . . ). The resources provide services including, without limitation, data storage services and migration services as described above. In one instance, a cloud service can be embodied as a web, Internet, or application service but is not limited thereto.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
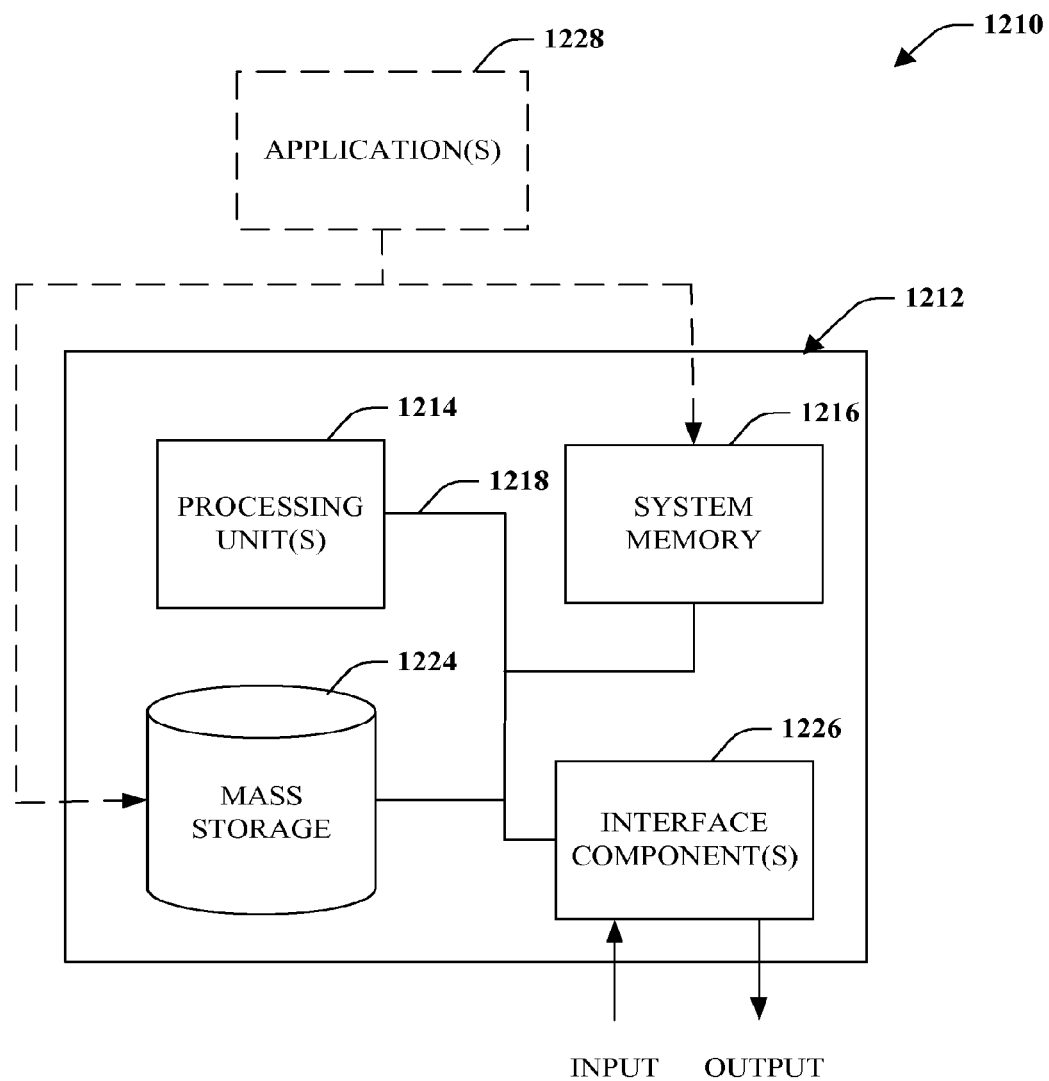
FIG. 12 is a schematic block diagram illustrating a suitable operating environment for aspects of the subject disclosure.
Figure 13:
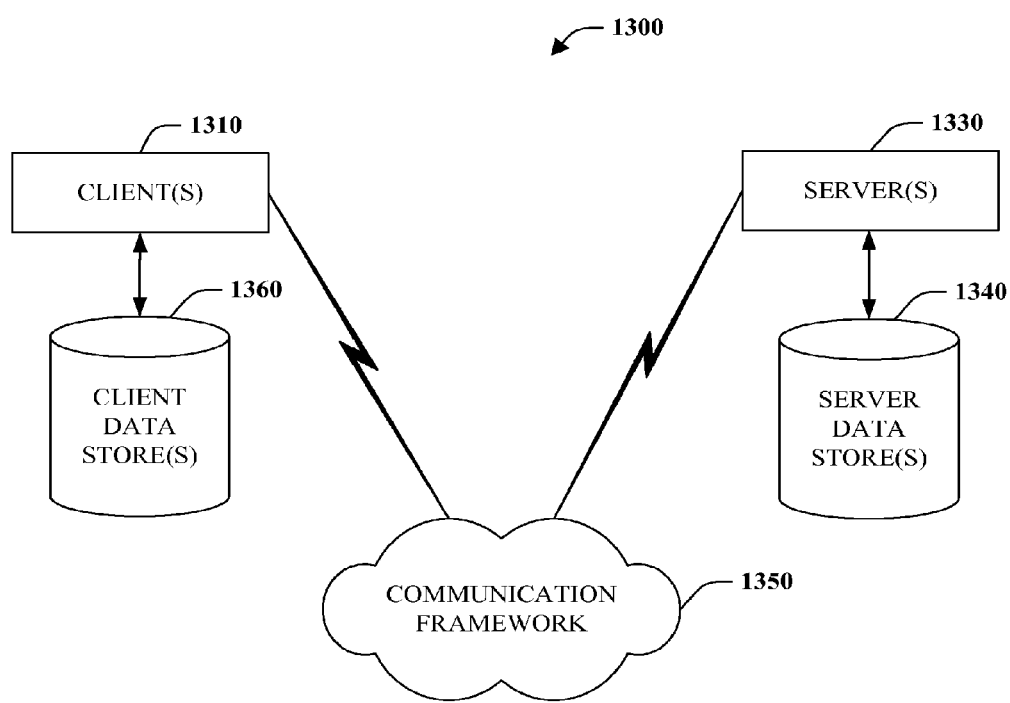
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory, or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g., CRT, LCD, plasma . . . ), speakers, printers and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

Client/server interactions can be utilized with respect to enabling migration as described herein. For example, the cloud migration service can be executed by one or more server(s) with respect to clients 1310 including mobile communication devices among others across the communication framework 1350. More specifically, personalization data such as settings and/or state information can be transmitted to and from client data store(s) 1360 and server data store(s) 1340 to effect migration.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:
1. A method for facilitating device provisioning, comprising:
 identifying, by a remote device, a mobile communication device, wherein the mobile communication device stores personalizations associated with a user, wherein functionality of the remote device is reduced relative to functionality of the mobile communication device, the functionality including display functionality and processing functionality;

establishing a communication channel with the mobile communication device to provision the remote device;

receiving a subset of the personalizations from the mobile communication device, wherein the mobile communication device is configured to determine the subset of the personalizations for the user based on the functionality of the remote device; and in response to receipt of the subset of the personalizations, provisioning the remote device using the subset of personalizations.

2. The method of claim 1 in which the communication channel comprises a wireless communication channel.

3. The method of claim 2 in which the wireless communication channel comprises one of WiFi or short range communication channel.

4. The method of claim 2 in which the wireless communication channel comprises a network-based service supporting communication over one of a licensed band or unlicensed band.

5. The method of claim 1 in which the personalizations comprise one of installed applications, content, settings, rules, user preferences, ringtones, or state.

6. The method of claim 1 in which at least some of the personalizations stored on the mobile communication device are retrieved from a cloud service.

7. The method of claim 1 further comprising translating a format of the stored personalizations, wherein the provisioning of the remote device utilizes personalizations having a translated format.

8. The method of claim 7 in which the translating is performed according to the functionality of the remote device.

9. The method of claim 1 further including sensing a level of connectivity over the communication channel and wherein the subset of personalizations is determined based on the sensed connectivity.

10. A remote device, comprising:
a processor;
a wireless communication interface configured to support communications between the remote device and a mobile communication device, wherein functionality of the remote device is reduced relative to functionality of the mobile communication device, the functionality including display functionality and processing functionality; and
a memory storing computer-executable instructions which, when executed the processor, cause the remote device to
utilize the wireless communication interface to communicate with the mobile communication device over a wireless communication channel, and
acquire data from the mobile communication device over the wireless communication channel, wherein the acquired data comprises a subset of personalizations that are stored on the mobile communication device, and wherein the subset is determined based on the functionality of the remote device.

11. The remote device of claim 10 in which the computer-executable instructions further cause the remote device to use the acquired data for provisioning.

12. The remote device of claim 10 in which the stored personalizations are partitioned based on one or more of user identities.

13. The remote device of claim 10 in which the computer-executable instructions further cause the remote device to selectively acquire the data based on connectivity over the wireless communication channel.

14. The remote device of claim 13 in which the selective acquisition includes one of caching, pre-fetching, or persisting.

15. One or more non-transitory computer-readable media storing instructions which, when executed by a remote device cause the remote device to:
enable identification of the remote device by a mobile communication device, wherein functionality of the remote device is reduced relative to functionality of the mobile communication device, the functionality including display functionality and processing functionality;
migrate personalizations from the mobile communication device to the remote device over a wireless communication channel that is established between the remote device and the mobile communication device, wherein the personalizations are associated with a user and are selected for migration based on the functionality of the remote device, and wherein the migrated personalizations include applications or data; and
provision the remote device using the migrated personalizations so that the applications or data are synchronized between the remote device and the mobile communication device.

16. The one or more non-transitory computer-readable media of claim 15 in which the identification of the remote device is based on a location of the remote device relative to the mobile communication device.

17. The one or more non-transitory computer-readable media of claim 15 in which the identification of the remote device is based on connectivity over the wireless communication channel.

18. The one or more non-transitory computer-readable media of claim 15 in which the mobile communication device stores personalizations which are not migrated to the remote device.

19. The one or more non-transitory computer-readable media of claim 15 in which the migration is performed in response to an input from the user.

20. The one or more non-transitory computer-readable media of claim 19 in which the user input is received at the mobile communication device.

* * * * *